(12) United States Patent
Srinivasan et al.

(10) Patent No.: US 7,362,270 B2
(45) Date of Patent: Apr. 22, 2008

(54) SYSTEM AND METHOD TO PERFORM NETWORK NODE LOCALIZATION TRAINING USING A MOBILE NODE

(75) Inventors: Bhaskar Srinivasan, Menlo Park, CA (US); Lakshmi Venkatraman, Mountain View, CA (US); Abtin Keshavarzian, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 11/418,665

(22) Filed: May 5, 2006

(65) Prior Publication Data

US 2007/0257839 A1    Nov. 8, 2007

(51) Int. Cl.
*G01S 3/02* (2006.01)
*H01Q 3/00* (2006.01)
(52) U.S. Cl. ...................... 342/458; 342/360
(58) Field of Classification Search .............. 342/362, 342/458, 463–465
See application file for complete search history.

(56) References Cited

U.S. PATENT DOCUMENTS

| 3,706,096 | A | * | 12/1972 | Hammack | 342/461 |
| 4,060,809 | A | * | 11/1977 | Baghdady | 342/464 |
| 5,955,973 | A | * | 9/1999 | Anderson | 342/107 |
| 6,201,497 | B1 | * | 3/2001 | Snyder et al. | 342/357.06 |
| 6,295,022 | B1 | * | 9/2001 | Dutka | 342/357.06 |

OTHER PUBLICATIONS

B.W. Parkinson et al., editors, Global Positioning System: Theory and Applications, vol. I, American Institute of Aeronautics and Astronautics, Inc., p. 435, 440, 1996.*

* cited by examiner

*Primary Examiner*—Thomas H. Tarcza
*Assistant Examiner*—Fred H. Mull
(74) *Attorney, Agent, or Firm*—Kenyon & Kenyon LLP

(57) ABSTRACT

A method and system for determining a location of at least one stationary node of a wireless network, which includes providing a predetermined path within a geographic space of the wireless network, prior to localization, moving a mobile node along the predetermined path, measuring a network parameter with respect to the mobile node as it moves along the predetermined path, and performing a localization scheme to estimate the location of the at least one stationary node using the measured network parameter.

19 Claims, 3 Drawing Sheets

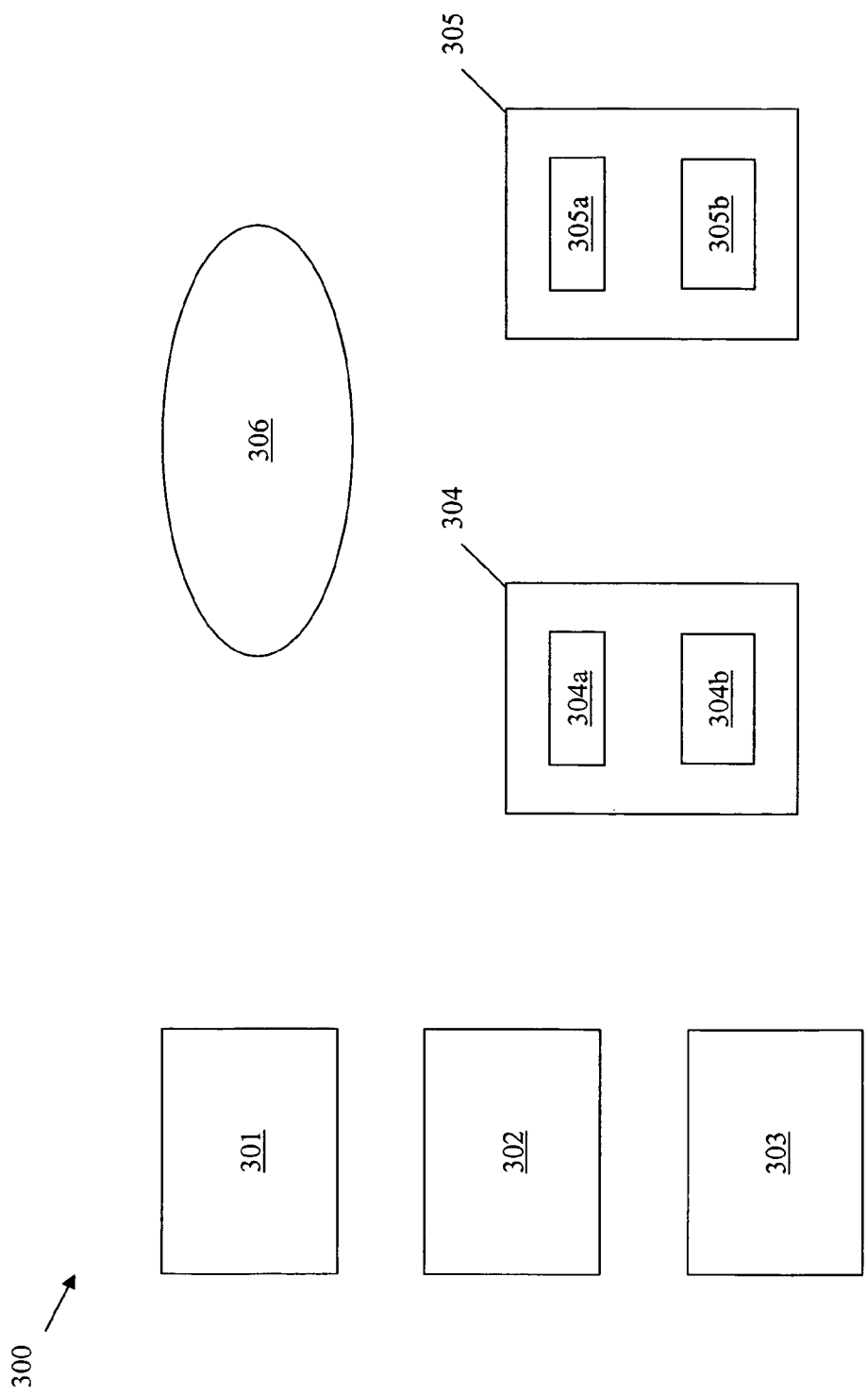

SYSTEM AND METHOD TO PERFORM NETWORK NODE LOCALIZATION TRAINING USING A MOBILE NODE

FIELD OF THE INVENTION

The present invention relates to a system and method to locate at least one stationary node of a wireless network using a mobile node.

BACKGROUND INFORMATION

A network may include a number of nodes deployed within a particular geographic area. To maintain the nodes of the network and for other reasons, it may be required that the exact location or position of one or more of the nodes be determined. In this regard, to determine the location of a network node, a localization scheme may be employed to derive the location of the node using certain inter-node measurements.

Before attempting to derive the location of a network node, some localization schemes first require knowledge of the distance between the network node and other network nodes. If the distance between network nodes is unknown, it may be estimated. In this regard, to estimate the distance between network nodes, certain techniques may be employed, which depend on the hardware capability of the nodes. In one technique, the received signal strength (RSS) between two network nodes may be used to estimate the distance between them. In another technique, the packet success rate (PSR) between a sender node and a receiver node may be used to estimate the distance between the two nodes. However, use of such techniques alone to estimate the distance between two network nodes may not be accurate since the estimated distance may also depend on other parameters of the network as well. For example, to accurately estimate the distance using the received signal strength (RSS), information regarding the particular radio frequency (RF) characteristics of the network environment may also be required.

SUMMARY OF THE INVENTION

The present invention provides an exemplary method to train a network system to make better estimates of the distances between the nodes of the network system. In this regard, the exemplary method may be performed prior to network node localization.

According to an exemplary embodiment of the present invention, prior to localization, a network installer or other person carries a mobile node unit, which may be similar in terms of capabilities as compared to other network nodes, travels over a predetermined path in the network. Here, the predetermined path may be generated, for example, in such a manner so as to provide suitable data for creating an estimator, or alternatively, the predetermined path may be generated randomly. Once generated, the predetermined path may be visually indicated, for example, to the installer as part of a map of the floor plan of the geographic area in which the network nodes are located. While the mobile node is moving on the predetermined path, the network may take measurements, such as, for example, the received signal strength (RSS) between the mobile node and one or more stationary nodes of the network, or the packet success rate (PSR) of transmission(s) between the mobile node and one or more stationary nodes of the network. Thereafter, the measurements taken may be used to provide a more accurate model of the distance between the network nodes.

According to an exemplary method of the present invention, a mobile node is used to collect data, which is used to estimate the locations of one or more nodes of the network. In this regard, an exemplary system of the present invention may generate a predefined path, which is supplied to a network installer, who takes the mobile node and moves it along the predefined path. As the installer moves along the predefined path, the network takes certain measurements with respect to the mobile node and/or one or more stationary nodes of the network. The measurements obtained by the mobile node or the one or more stationary nodes are then used to provide a more accurate estimate of the location of the one or more nodes of the network.

According to an exemplary method of the present invention, information from other systems not part of the network is used to provide, or at least help provide, the predefined path and/or take measurements while the mobile node moves along the predefined path. For example, a temporary ground truth system may be used to provide a more accurate "true" trajectory of the mobile node as it moves along the predefined path and as measurements are taken with respect to the moving mode node. In this regard, the temporary ground truth system may be, for example, a Lidar, Global Positioning System (GPS), or a stereo camera.

According to an exemplary method of the present invention, previous estimates of the distance between one or more nodes of the network, or measurements taken with respect to a previous movement of the mobile node along the predefined path at an earlier time (i.e., an earlier "run" of the mobile node along the predefined path) may be used in combination with current estimates and/or current measurements. For example, previous estimates of the position of one or more network nodes may be used to iteratively estimate the location, or to formulate a revised predefined path of the mobile node. In this regard, such use of previous estimates and/or previous measurements with respect to a previously-defined path may provide more suitable data to calculate future estimates.

According to an exemplary method of the present invention, one or more sensors are used to determine, or at least help determine, the position of the one or more nodes of the network. For example, inertial sensors may be used to determine a relative position of the one or more network nodes. Here, such a relative position may be in respect to another network node, the mobile node, or another known position within the geographic area of the network.

According to an exemplary method of the present invention, one or more sensors are used to detect a network parameter with respect to non-moving object. For example, an inertial sensor may be used to monitor a certain aspect of a stationary user, which is used to estimate a variation in power and/or a packet success rate.

An exemplary embodiment and/or exemplary method of the present invention is directed to determining a location of at least one stationary node of a wireless network, the exemplary embodiment and/or exemplary method including providing a predetermined path within a geographic space of the wireless network, prior to localization, moving a mobile node along the predetermined path, measuring a network parameter with respect to the mobile node as it moves along the predetermined path, and performing a localization process to estimate the location of the at least one stationary node using the measured network parameter.

According to another exemplary embodiment and/or exemplary method of the present invention, the localization process estimates a distance between the mobile node and the at least one stationary node of the network using the measured network parameter.

Another exemplary embodiment and/or exemplary method of the present invention is directed to determining a location of at least one stationary node of a wireless network, in which the measured network parameter is a received signal strength (RSS) between the mobile node and the at least one stationary node.

Yet another exemplary embodiment and/or exemplary method of the present invention is directed to determining a location of at least one stationary node of a wireless network, in which the measured network parameter is a packet success rate of a transmission between the mobile node and the at least one stationary node.

Still another exemplary embodiment and/or exemplary method of the present invention is directed to determining a location of at least one stationary node of a wireless network, in which the wireless network includes a wireless sensor network.

Yet another exemplary embodiment and/or exemplary method of the present invention is directed to determining a location of at least one stationary node of a wireless network, in which the wireless network includes an ad-hoc network.

Still another exemplary embodiment and/or exemplary method of the present invention is directed to determining a location of at least one stationary node of a wireless network, in which the stationary nodes are configured in a multi-hop topology.

Yet another exemplary embodiment and/or exemplary method of the present invention is directed to determining a location of at least one stationary node of a wireless network, in which the predetermined path is provided visually as part of a map of the geographic space of the wireless network.

Still another exemplary embodiment and/or exemplary method of the present invention is directed to determining a location of at least one stationary node of a wireless network, in which a movement of the mobile node is monitored as it moves along the predetermined path in order to provide a recorded trajectory of the mobile node as it moves along the predefined path.

Yet another exemplary embodiment and/or exemplary method of the present invention is directed to determining a location of at least one stationary node of a wireless network, in which the location is iteratively estimated based on at least one of a previous estimate of the location of the at least one stationary node and a measurement taken with respect to a previous run of the mobile node along the predefined path.

Still another exemplary embodiment and/or exemplary method of the present invention is directed to determining a location of at least one stationary node of a wireless network, in which a revised predefined path of the mobile node is based on at least one of a previous estimate of the location of the at least one stationary node and a measurement taken with respect to a previous run of the mobile node along the predefined path.

An exemplary embodiment and/or exemplary method of the present invention is directed to determining a location of at least one stationary node of a wireless sensor network, the exemplary embodiment and/or exemplary method including providing in a visual manner a predetermined path within a geographic space of the wireless sensor network, prior to localization, moving a mobile node along the predetermined path, measuring a network parameter with respect to the mobile node as it moves along the predetermined path, monitoring a movement of the mobile node as it moves along the predetermined path to provide a recorded trajectory of the mobile node as it moves along the predefined path, estimating a distance between the mobile node and the at least one stationary node based on the measured network parameter and the recorded trajectory, and calculating the location of the at least one stationary node based on the estimated distance between the mobile node and the at least one stationary node, in which the location is iteratively calculated based on a measurement taken with respect to a previous run of the mobile node along the predefined path to provide a revised predefined path of the mobile node.

An exemplary embodiment and/or exemplary method of the present invention is directed to a system to geographically locate at least one node of a wireless network, the system including an arrangement to determine a predefined path through a geographic space of the wireless network, a mobile node to communicate with at least one stationary node of the wireless network as the mobile node is moved along the predefined path, an arrangement to estimate a distance between the mobile node and the at least one stationary node based on a measured network parameter, and an arrangement to determine a location of the at least one node based on the estimated distance.

Another exemplary embodiment and/or exemplary method of the present invention is directed to a system to geographically locate at least one node of a wireless network, in which the measured network parameter includes at least one of a received signal strength (RSS) between the mobile node and the at least one stationary node, and a packet success rate of a transmission between the mobile node and the at least one stationary node.

Yet another exemplary embodiment and/or exemplary method of the present invention is directed to a system to geographically locate at least one node of a wireless network, in which the mobile node includes a measuring arrangement to measure the network parameter.

Still another exemplary embodiment and/or exemplary method of the present invention is directed to a system to geographically locate at least one node of a wireless network, in which the at least one stationary node includes a measuring arrangement to measure the network parameter.

Yet another exemplary embodiment and/or exemplary method of the present invention is directed to a system to geographically locate at least one node of a wireless network, in which the system further includes an arrangement to monitor a movement of the mobile unit as it moves along the predetermined path.

Still another exemplary embodiment and/or exemplary method of the present invention is directed to a system to geographically locate at least one node of a wireless network, in which the arrangement to monitor the movement includes a Lidar.

Yet another exemplary embodiment and/or exemplary method of the present invention is directed to a system to geographically locate at least one node of a wireless network, in which the arrangement to monitor the movement includes a Global Positioning System (GPS).

Still another exemplary embodiment and/or exemplary method of the present invention is directed to a system to geographically locate at least one node of a wireless network, in which the arrangement to monitor the movement includes a stereo camera.

BRIEF DESCRIPTION OF THE DRAWINGS

FIG. 3 shows exemplary elements of an exemplary system to calculate the predefined path through the geographic space of the exemplary wireless network of FIG. 1, to measure one or more network parameters as the mobile node is moved along the predefined path, to estimate a distance between the mobile node and the at least one stationary node of the exemplary wireless network based on the measured network parameter, and to calculate a location of the stationary node based on the estimated distance(s).

DETAILED DESCRIPTION

Figure 1:
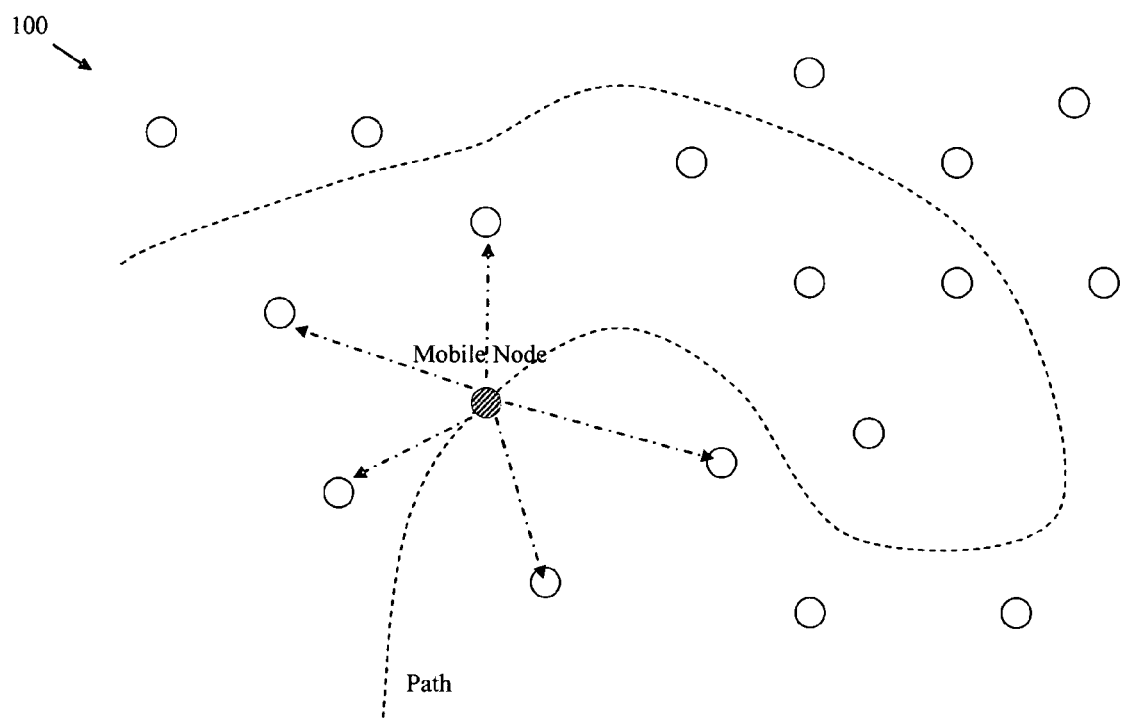
FIG. 1 shows an exemplary wireless network, in which a mobile node travels along a predetermined path with respect to a geographic space containing at least one stationary node of the exemplary wireless network, and in which certain measurements are taken with respect to the moving node and the at least one stationary node so as to provide an estimate of the distances between one or more of the network nodes.

FIG. 1 shows an exemplary wireless network 100, in which a mobile node travels along a predetermined path with respect to a geographic space containing at least one stationary node of the exemplary wireless network 100, and in which certain measurements are taken with respect to the moving node and the least one stationary node so as to provide an estimate of the location of one or more of the network nodes. In FIG. 1, the mobile node is represented by a hatched circle, the stationary nodes are represented by non-hatched circles, and the predetermined path is represented by a dashed line.

According to an exemplary embodiment of the present invention, the exemplary wireless network 100 may be a wireless sensor network located, for example, in an office building, a home, a farm or an airport terminal, in which the network nodes are configured in a multi-hop topology formed, for example, in an ad-hoc manner. The at least one stationary node is geographically fixed, at least temporarily, and may be configured, for example, to measure one or more network parameters and/or communicate with the mobile node. The mobile node may be similar in terms of capabilities as compared to the at least one stationary node or the other network nodes, or alternatively, the mobile node may by specially configured with additional or less feature capabilities.

Figure 2:
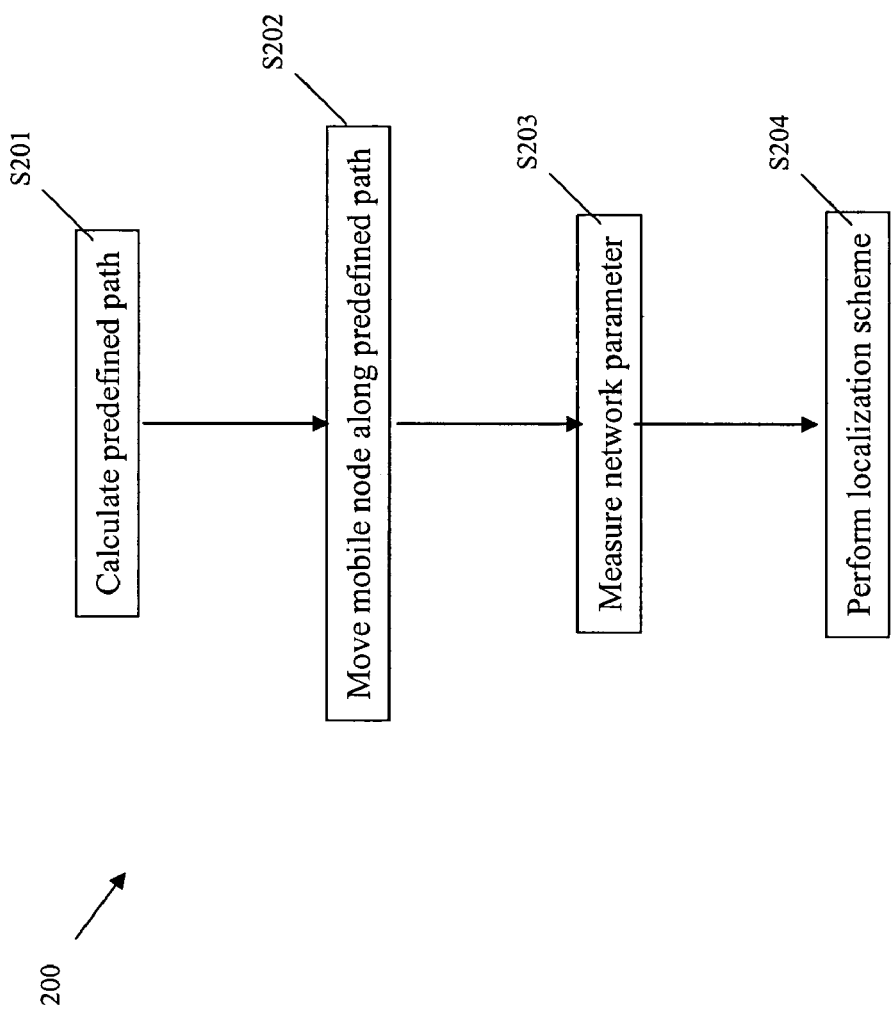
FIG. 2 shows an exemplary method to determine the location of at least one stationary node of the wireless network of FIG. 1.

FIG. 2 shows an exemplary method 200 to determine the location of at least one stationary node of the exemplary wireless network 100 of FIG. 1. In step S201, a predetermined path is provided within a geographic space of the exemplary wireless network 100, which includes one or more stationary nodes of the exemplary wireless network 100. Here, the predetermined path may be provided in any suitable form, including, for example, in a visual form as part of a map of the geographic space of the exemplary wireless network 100, which is supplied to an operator, administrator and/or installer of the network.

In step S202, prior to localization, the mobile node is moved along the predetermined path. Here, the mobile node may be carried, for example, by the network installer, who takes the mobile node and proceeds along the predefined path. Alternatively, the mobile node may be attached to another movable device that is configured to follow the predefined path.

In step S203, at least one network parameter is measured with respect to the mobile node as it moves along the predetermined path. In this regard, the at least one measured network parameter may include, for example, a received signal strength (RSS) between the mobile node and the at least one stationary node, or a packet success rate of a transmission between the mobile node and the at least one stationary node. Alternatively, or in addition, other network-related parameters may be measured, which are distance sensitive with respect to the mobile node, or relate to a movement of the mobile node or its location within the geographic space of the exemplary wireless network 100.

In step S204, a localization method or process is performed to estimate the location of the at least one stationary node using the at least one measured network parameter. In this regard, the localization method may calculate the distance between the stationary nodes of the exemplary wireless network 100, or between the stationary node and the mobile node, using the measured network parameter and/or previous estimates of the distance between one or more nodes of the exemplary wireless network 100, or measurements taken with respect to a previous movement of the mobile node along the predefined path at an earlier time (i.e., an earlier "run" of the mobile node along the predefined path), which is used in combination with current estimates and/or current measurements. For example, previous estimates of the position of one or more network nodes may be used to iteratively estimate the location, or to formulate a revised predefined path of the mobile node.

FIG. 3 shows exemplary elements 301 to 306 of an exemplary system 300 to geographically locate one or more nodes of the exemplary wireless network 100. The exemplary system 300 includes a first processing arrangement 301, a second processing arrangement 302, a third processing arrangement 303, a stationary node 304, a mobile node 305, and a secondary sensing arrangement 306.

The first processing arrangement 301 is configured to calculate a predefined path through a geographic space of the wireless network 100, in which at least one stationary node is located. Here, the predetermined path may be provided visually, for example, as part of a map of the geographic space of the wireless network 100. In particular, the predetermined path may be provided as part of a map of the floor plan of the geographic area in which the network nodes are located. Such a map may be supplied, for example, to an operator, administrator and/or installer of the network 100.

The stationary node 304 and the mobile node 305 communicate with each other and/or measure one or more network parameters as the mobile node 305 is moved along the predefined path. In this regard, the stationary node 304 and/or the mobile node 305 may include a transceiver 304a/305a and one or more network sensors 304b/305b to measure, for example, a received signal strength (RSS) between the mobile node 305 and the stationary node 304, or a packet success rate of a transmission between the mobile node 305 and the stationary node 304. The secondary sensing arrangement 306 provides further measurements, which are used to supplement the network parameters and/or formulate a revised predefined path of the mobile node. In this regard, the secondary sensing arrangement 306 may be provided via a Lidar, a Global Positioning System (GPS), and/or a stereo camera.

The second processing arrangement 302 estimates a distance between the mobile node 305 and the stationary node 304 based on the measured network parameter, and the third processing arrangement 303 calculates a location of the stationary node 304 and/or other network nodes based on the estimated distance. Here, previous estimates of the distance between the mobile node 305 and the stationary node 304, or between one or more other nodes of the network 100, or measurements taken with respect to a previous movement of the mobile node 305 along the predefined path at an earlier time (i.e., an earlier "run" of the mobile node 305 along the predefined path) may be used in combination with current estimates and/or current measurements. For example, previous estimates of the position of one or more network nodes may be used to calculate iteratively the location of the stationary node 304 or other networks nodes, or to formulate a revised predefined path of the mobile node 305. Accordingly, the estimated distance or location may be a predictive value, which is updated periodically for improved accuracy or to accommodate changing network conditions and/or configuration(s).

According to an exemplary embodiment of the present invention, the first processing arrangement 301, the second processing arrangement 302, and the third processing arrangement 303 may be provided as a single processing unit, multiple processing units, or a sub-combination thereof. Moreover, each processing unit may include custom designed control circuitry and/or a microprocessor and program instructions arranged, for example, as part of a computing arrangement, which is supportive, for example, a wide variety of operating and/or application development environments.

What is claimed is:

1. A method of determining a location of at least one stationary node of a wireless network, the method comprising:
    providing a predetermined path within a geographic space of the wireless network;
    prior to localization, moving a mobile node along the predetermined path;
    measuring a network parameter with respect to the mobile node as it moves along the predetermined path, wherein the measured network parameter is one of a received signal strength (RSS) between the mobile node and the at least one stationary node and a packet success rate of a transmission between the mobile node and the at least one stationary node; and
    performing a localization process to estimate the location of the at least one stationary node using the measured network parameter.

2. The method of claim 1, wherein the localization process estimates a distance between the mobile node and the at least one stationary node of the network using the measured network parameter.

3. The method of claim 1, wherein the measured network parameter is the RSS between the mobile node and the at least one stationary node.

4. The method of claim 1, wherein the measured network parameter is the packet success rate of a transmission between the mobile node and the at least one stationary node.

5. The method of claim 1, wherein the wireless network includes a wireless sensor network.

6. The method of claim 1, wherein the predetermined path is provided visually as part of a map of the geographic space of the wireless network.

7. The method of claim 6, further comprising:
    monitoring a movement of the mobile node as it moves along the predetermined path in order to provide a recorded trajectory of the mobile node as it moves along the predefined path.

8. A method of determining a location of at least one stationary node of a wireless network, wherein the wireless network includes an ad-hoc network, the method comprising:
    providing a predetermined path within a geographic space of the wireless network;
    prior to localization, moving a mobile node along the predetermined path; measuring a network parameter with respect to the mobile node as it moves along the predetermined path; and
    performing a localization process to estimate the location of the at least one stationary node using the measured network parameter.

9. A method of determining a location of at least one stationary node of a wireless network, the method comprising:
    providing a predetermined path within a geographic space of the wireless network;
    prior to localization, moving a mobile node along the predetermined path;
    measuring a network parameter with respect to the mobile node as it moves along the predetermined path; and
    performing a localization process to estimate the location of the at least one stationary node using the measured network parameter, wherein the at least one stationary node is configured in a multi-hop topology.

10. A method of determining a location of at least one stationary node of a wireless network, the method comprising:
    providing a predetermined path within a geographic space of the wireless network;
    prior to localization, moving a mobile node along the predetermined path;
    measuring a network parameter with respect to the mobile node as it moves along the predetermined path; and
    performing a localization process to estimate the location of the at least one stationary node using the measured network parameter,
    wherein the location is iteratively estimated based on at least one of a previous estimate of the location of the at least one stationary node and a measurement taken with respect to a previous run of the mobile node along the predefined path.

11. A method of determining a location of at least one stationary node of a wireless network, the method comprising:
    providing a predetermined path within a geographic space of the wireless network;
    prior to localization, moving a mobile node along the predetermined path;
    measuring a network parameter with respect to the mobile node as it moves along the predetermined path; and
    performing a localization process to estimate the location of the at least one stationary node using the measured network parameter,
    wherein a revised predefined path of the mobile node is based on at least one of a previous estimate of the location of the at least one stationary node and a measurement taken with respect to a previous run of the mobile node along the predefined path.

12. A method of determining a location of at least one stationary node of a wireless sensor network, the method comprising:
    providing in a visual manner a predetermined path within a geographic space of the wireless sensor network;
    prior to localization, moving a mobile node along the predetermined path;

measuring a network parameter with respect to the mobile node as it moves along the predetermined path;

monitoring a movement of the mobile node as it moves along the predetermined path to provide a recorded trajectory of the mobile node as it moves along the predefined path;

estimating a distance between the mobile node and the at least one stationary node based on the measured network parameter and the recorded trajectory; and calculating the location of the at least one stationary node based on the estimated distance between the mobile node and the at least one stationary node, wherein the location is iteratively calculated based on a measurement taken with respect to a previous run of the mobile node along the predefined path to provide a revised predefined path of the mobile node.

13. A system to geographically locate at least one node of a wireless network, comprising:

an arrangement to determine a predefined path through a geographic space of the wireless network;

a mobile node to communicate with at least one stationary node of the wireless network as the mobile node is moved along the predefined path;

an arrangement to estimate a distance between the mobile node and the at least one stationary node based on a measured network parameter; and an arrangement to determine a location of the at least one node based on the estimated distance, wherein the measured network parameter includes at least one of a received signal strength (RSS) between the mobile node and the at least one stationary node, and a packet success rate of a transmission between the mobile node and the at least one stationary node.

14. The system of claim 13, wherein the at least one stationary node includes a measuring arrangement to measure the network parameter.

15. The system of claim 13, further comprising:

an arrangement to monitor a movement of the mobile unit as it moves along the predefined path.

16. The system of claim 15, wherein the arrangement to monitor the movement includes a Global Positioning System (GPS).

17. A system to geographically locate at least one node of a wireless network, comprising:

an arrangement to determine a predefined oath through a geographic space of the wireless network;

a mobile node to communicate with at least one stationary node of the wireless network as the mobile node is moved along the predefined path;

an arrangement to estimate a distance between the mobile node and the at least one stationary node based on a measured network parameter; and an arrangement to determine a location of the at least one node based on the estimated distance, wherein the mobile node includes a measuring arrangement to measure the network parameter.

18. A system to geographically locate at least one node of a wireless network, comprising:

an arrangement to determine a predefined path through a geographic space of the wireless network;

a mobile node to communicate with at least one stationary node of the wireless network as the mobile node is moved along the predefined path;

an arrangement to estimate a distance between the mobile node and the at least one stationary node based on a measured network parameter;

an arrangement to determine a location of the at least one node based on the estimated distance; and an arrangement to monitor a movement of the mobile unit as it moves along the predefined path, wherein the arrangement to monitor the movement includes a Lidar.

19. A system to geographically locate at least one node of a wireless network, comprising:

an arrangement to determine a predefined path through a geographic space of the wireless network;

a mobile node to communicate with at least one stationary node of the wireless network as the mobile node is moved along the predefined path;

an arrangement to estimate a distance between the mobile node and the at least one stationary node based on a measured network parameter;

an arrangement to determine a location of the at least one node based on the estimated distance; and an arrangement to monitor a movement of the mobile unit as it moves along the predefined path, wherein the arrangement to monitor the movement includes a stereo camera.

* * * * *